(12) United States Patent
Botte

(10) Patent No.: US 8,613,842 B2
(45) Date of Patent: *Dec. 24, 2013

(54) LAYERED ELECTROCATALYST FOR OXIDATION OF AMMONIA AND ETHANOL

(75) Inventor: Gerardine G. Botte, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,570

(22) Filed: Jul. 9, 2012

(65) Prior Publication Data

US 2012/0325682 A1  Dec. 27, 2012

Related U.S. Application Data

(60) Division of application No. 12/114,782, filed on May 4, 2008, now Pat. No. 8,216,956, and a continuation-in-part of application No. PCT/US2006/017641, filed on May 8, 2006, said application No. 12/114,782 is a continuation-in-part of application No. 10/962,894, filed on Oct. 12, 2004, now Pat. No. 7,485,211.

(60) Provisional application No. 60/916,222, filed on May 4, 2007, provisional application No. 60/974,766, filed on Sep. 24, 2007, provisional application No. 60/678,725, filed on May 6, 2005, provisional application No. 60/510,473, filed on Oct. 10, 2003.

(51) Int. Cl.
*C25C 3/00* (2006.01)
*B01D 59/40* (2006.01)
*C25C 7/00* (2006.01)
*C25B 9/00* (2006.01)
*C25D 17/00* (2006.01)
*G01F 1/64* (2006.01)
*G01N 17/00* (2006.01)
*G01N 27/26* (2006.01)

(52) U.S. Cl.
USPC ............................ 204/400; 204/242; 205/775

(58) Field of Classification Search
USPC .......... 205/105, 112, 775; 204/242, 292, 471, 204/484, 266, 252, 263
See application file for complete search history.

(56) References Cited

U.S. PATENT DOCUMENTS

| 3,650,838 A | 3/1972 | Giner et al. |
| 3,947,333 A | 3/1976 | Bianchi et al. |

(Continued)

FOREIGN PATENT DOCUMENTS

| EP | 1408569 A2 | 4/2004 |
| WO | 02/44081 A1 | 6/2002 |

(Continued)

OTHER PUBLICATIONS

Abreu et al., "Characterization of electrooxidized Pittsburgh No. 8 Coal," Fuel, vol. 86, pp. 573-587, (2007).

(Continued)

*Primary Examiner* — Luan Van
*Assistant Examiner* — Maris R Kessel

(57) ABSTRACT

A layered electrocatalyst for oxidizing ammonia, ethanol, or combinations thereof, comprising: a carbon support integrated with a conductive metal; at least one first metal plating layer at least partially deposited on the carbon support, wherein the at least one first metal plating layer is active to OH adsorption and inactive to a target species, and wherein the at least one first metal plating layer has a thickness ranging from 10 nanometers to 10 microns; and at least one second metal plating layer at least partially deposited on the at least one first metal plating layer, wherein the at least one second metal plating layer is active to the target species, and wherein the at least one second metal plating layer has a thickness ranging from 10 nanometers to 10 microns, forming a layered electrocatalyst.

12 Claims, 11 Drawing Sheets

(56) References Cited

U.S. PATENT DOCUMENTS

| | | | |
|---|---|---|---|
| 3,956,107 | A | 5/1976 | Mitchell, III |
| 4,226,683 | A | 10/1980 | Vaseen |
| 4,345,982 | A | 8/1982 | Ikawa et al. |
| 4,388,162 | A | 6/1983 | Sammells et al. |
| 4,419,208 | A | 12/1983 | Gray |
| 4,453,594 | A | 6/1984 | Patton et al. |
| RE31,824 | E | 2/1985 | D'Agostino et al. |
| 4,498,962 | A | 2/1985 | Oda et al. |
| 4,643,809 | A | 2/1987 | Botts et al. |
| 4,725,339 | A | 2/1988 | Bindra et al. |
| 5,795,699 | A | 8/1998 | Zhou et al. |
| 5,954,928 | A | 9/1999 | Kishi et al. |
| 6,099,704 | A | 8/2000 | Bacquet et al. |
| 6,135,126 | A | 10/2000 | Joshi |
| 6,238,530 | B1 | 5/2001 | Yoshida et al. |
| 6,248,467 | B1 | 6/2001 | Wilson et al. |
| 6,531,050 | B1 | 3/2003 | Waite |
| 6,533,919 | B1 | 3/2003 | Narayanan et al. |
| 6,627,035 | B2 | 9/2003 | Fan et al. |
| 6,764,589 | B1 | 7/2004 | Puetter |
| 6,828,057 | B2 | 12/2004 | Ovshinsky et al. |
| 6,972,160 | B2 | 12/2005 | Okada et al. |
| 7,098,163 | B2 | 8/2006 | Hampden-Smith et al. |
| 7,144,476 | B2 | 12/2006 | Wilde et al. |
| 7,485,211 | B2 | 2/2009 | Botte et al. |
| 2002/0037446 | A1 | 3/2002 | Iyer |
| 2002/0132154 | A1 | 9/2002 | Adzic et al. |
| 2003/0070910 | A1 | 4/2003 | Otsuka et al. |
| 2003/0089620 | A1 | 5/2003 | Reichman et al. |
| 2003/0226763 | A1 | 12/2003 | Narayanan et al. |
| 2004/0151896 | A1 | 8/2004 | Houda et al. |
| 2005/0211569 | A1 | 9/2005 | Botte et al. |
| 2006/0135359 | A1 | 6/2006 | Adzic et al. |
| 2006/0228606 | A1 | 10/2006 | Fiebig et al. |
| 2006/0234039 | A1 | 10/2006 | Bose et al. |
| 2006/0269824 | A1 | 11/2006 | Hampden-Smith et al. |
| 2006/0292434 | A1 | 12/2006 | Hampden-Smith et al. |
| 2007/0077491 | A1 | 4/2007 | Burchardt |
| 2008/0314755 | A1 | 12/2008 | Botte |
| 2008/0318097 | A1 | 12/2008 | Botte |
| 2009/0050489 | A1 | 2/2009 | Botte |
| 2009/0081500 | A1 | 3/2009 | Botte |

FOREIGN PATENT DOCUMENTS

| | | | |
|---|---|---|---|
| WO | 0244081 | A1 | 6/2002 |
| WO | 2004061163 | A1 | 7/2004 |
| WO | 2005035444 | A2 | 4/2005 |
| WO | 2005038967 | A1 | 4/2005 |
| WO | 2006005724 | A2 | 1/2006 |
| WO | 2006008319 | A2 | 1/2006 |
| WO | 2006045673 | A1 | 5/2006 |
| WO | 2006063992 | A2 | 6/2006 |
| WO | 2006074829 | A1 | 7/2006 |
| WO | 2007082898 | A2 | 7/2007 |

OTHER PUBLICATIONS

Abreu et al., "Experimental and theoretical Investigation of the Electrolysis of Ethanol for Fuel Cell Applications," PowerPoint Presentation given at 206th Electrochemical Society Conference Meeting, Oct. 3-8, 2004, presented on Oct. 7, 2004.

Adanuvor et al., "Modeling the rotating disk electrode for studying the kinetics of electrochemical reactions," Electrochem. Soc., vol. 134, Issue 3, pp. 625-631, (1987).

Andonoglou et al., "Preparation and electrocatalytic activity of rhodium modified pitch-based carbon fiber electrodes," Electrochimica Acta, vol. 44, pp. 1455-1465, (1998).

Baldwin et al., "Voltammetry and electrolysis of coal slurries and H-coal liquids," Fuel, vol. 60, pp. 739-743, (1981).

Bergamaski et al., "Effect of alcohol concentration and electrode composition on the ethanol electrochemical oxidation," Ecletica Quimica, vol. 28, Issue 2, pp. 87-92, (2003).

Bonnin et al., "Effect of catalyst on electrolysis of ammonia effluents," Journal of Power Sources, vol. 182, pp. 284-290, (2008).

Bonnin et al., "Feasibility of Electrolyzing Ammonia Effluents for the Production of Hydrogen," Abstract 70, 206th Electrochemical Society Conference Meeting, Oct. 3-8, 2004, published before meeting.

Bonnin et al., "Feasibility of Electrolyzing Ammonia Effluents for the Production of Hydrogen," PowerPoint Presentation given at 206th Electrochemical Society Conference Meeting, Oct. 3-8, 2004, presented on Oct. 4, 2004.

Botte et al., "Ammonia electrolysis to power a hydrogen fuel cell: case study of an integrated system and economics," PowerPoint Presentation given at 206th Electrochemical Society Conference Meeting, Hawaii, Oct. 3-8, 2004.

Botte et al., "Ammonia Electrolysis to Power a Hydrogen Fuel Cell: Case Study of an Integrated System," PowerPoint Presentation given at 206th Electrochemical Society Conference Meeting Oct. 3-8, 2004, presented on Oct. 6, 2004.

Botte et al., "Analysis of Electro-kinetics of Ammonia Oxidation in Alkaline Media by Mathematical Modeling," PowerPoint Presentation given at 206th Electrochemical Society Conference Meeting, Oct. 3-8, 2004, presented on Oct. 4, 2004.

Botte et al., "Comparison of finite difference and control volume methods for solving differential equations," Computers and Chemical Eng., vol. 24, pp. 2633-2654, (2000).

Botte et al., "Electrolysis of Ohio coal for the production of hydrogen for fuel cell applications"—abstract submitted to Ohio University for subcontract OCRC3-04 D-4.1—quarterly report (year 1) Reporting Period: Mar. 1, 2004-May 30, 2004.

Botte et al., "Electrolysis of Ohio coal for the production of hydrogen for fuel cell applications"—abstract submitted to Ohio University for subcontract OCRC3-04 D-4.1—quarterly report (year 1) Reporting Period: Jun. 1, 2004-Sep. 1, 2004.

Botte et al., "Electrolysis of Ohio coal for the production of hydrogen for fuel cell applications"—abstract submitted to Ohio University for subcontract OCRC3-04 D-4.11—quarterly report (year 1)—Reporting Period: Dec. 1, 2003-Feb. 29, 2004.

Botte et al., "Electrolysis of Ohio coal for the production of hydrogen for fuel cell applications"—abstract submitted to Ohio University for subcontract OCRC3-04 D-4.11—quarterly report (year 1)—Reporting Period: Sep. 1, 2003-Dec. 1, 2003.

Botte et al., "Electrolysis of Ohio coal for the production of hydrogen for fuel cell applications"—abstract submitted to Ohio University for subcontract OCRC3-04 D-4.11—quarterly report (year 2) Reporting Period: Dec. 1, 2004-Feb. 28, 2005.

Botte et al., "Electrolysis of Ohio coal for the production of hydrogen for fuel cell applications"—abstract submitted to Ohio University for subcontract OCRC3-04 D-4.11—quarterly report (year 2) Reporting Period: Sep. 1, 2004-Dec. 1, 2004.

Botte et al., "Electrolysis of Ohio coal for the production of hydrogen for fuel cell applications"—abstract submitted to Ohio University for subcontract OCRC3-04 D-4.11—Reporting Period—Annual Report (year 1—Sep. 2004).

Botte et al., "Electrolysis of Ohio coal for the production of hydrogen for fuel cell applications"—Annual Project Report as of Sep. 2004.

Botte et al., "Electrolysis of Ohio coal for the production of hydrogen for fuel cell applications," PowerPoint Presentation given at 30th International Technical Conference on Coal Utilization & Fuel Systems, Clearwater, Florida, Apr. 17-21, 2005.

Botte et al., "Electrolysis of Ohio coal for the production of hydrogen for fuel cell applications," PowerPoint Presentation given at Ohio Coal Development Office, Ohio Air Quality Meeting, Dec. 2, 2004.

Botte et al., "Influence of some variables on the thermal behavior of a lithium-ion cell," Journal of Electrochemical Soc., vol. 146(3), pp. 914-923, (1999).

Botte et al., "Modeling lithium intercalation in a porous carbon electrode," Journal of Electrochemical Soc., vol. 148 (1), pp. A54-A66, (2001).

Botte et al., "MRSST a new thod to evaluate thermal stability of electrolytes for lithium ion batteries," Journal of Power Sources, vol. 119-121, pp. 815-820, (2003).

(56) References Cited

OTHER PUBLICATIONS

Botte et al., "New approximate model for nonlinear adsorption and concentration dependent surface diffusion in a single particle," Adsorption, vol. 5, pp. 373-380, (1999).
Botte et al., "Thermal stability of LiPF6-EC:EMC electrolyte for lithium ion batteries," Journal of Power Sources, vol. 97-98, pp. 570-575, (2001).
Botte, "Electrochemical coal gasification with novel electrodes,"—submitted to The Edison Materials Technology Center (EMTEC) in response to Hydrogen Program Solicitation Round 2, dated Jan. 12, 2005.
Botte, "Modeling volume changes due to lithium intercalation in a carbon fiber," Electrochimica Acta, vol. 50, pp. 5647-5658, (2005).
Botte, "Modeling volume changes due to lithium intercalation," Abstract 314, 204th Electrochemical Society Conference Meeting, Oct. 12-16, 2003, published before meeting.
Cairns et al., "Ammonia-oxygen fuel cell," Nature, vol. 217, pp. 780-781, (1968).
Carrete et al., "Fuel Cells-Fundamentals and Applications," Fuel Cells, vol. 1, pp. 5-39, (2001).
Choudhary et al., "CO-free fuel processing for fuel cell applications," Catalysis Today, vol. 77(1-2), pp. 65-78, (2002).
Cooper et al., "Electrocatalysis of the Oxidation of Ammonia by Raney Nickel and Platinum," PowerPoint Presentation given at 206th Electrochemical Society Conference Meeting, Oct. 3-8, 2004, presented on Oct. 5, 2004.
Cooper et al., "Electro-oxidation of Ammonia by Raney Nickel and Platinum," Abstract 517, 206th Electrochemical Society Conference Meeting, Oct. 3-8, 2004, published before meeting.
Cooper et al., "Hydrogen Production from the Electro-oxidation of Ammonia Catalyzed by Platinum and Rhodium on Raney Nickel Substrate," J. Electrochem. Soc., vol. 153, pp. A1894-A1901, (2006).
Cooper et al., "Optimization of the electrodeposition of Raney nickel on titanium substrate," J. Material Science, vol. 4, pp. 5608-5612, (2006).
Coughlin et al., "Consideration of electrodes and electrolytes for electrochemical gasification of coal by anodic oxidation," Journal of Applied Electrochemistry, vol. 10, pp. 729-740, (1908) XP-002546896.
De Abreu et al., "Experimental and theoretical investigation of the electrolysis of ethanol for fuel cell applications," PowerPoint Presentation given at 206th Electrochemical Society Conference Meeting, Hawaii, Oct. 3-8, 2004.
De et al., "Kinetic studies of the electrochemical treatment of nitrate and nitrite ions on iridium-modified carbon fiber," Chem. Eng. Technol., vol. 27, No. 1, pp. 56-64, (2004).
De Souza et al., "Electro-oxidation of ethanol on Pt, Rh, and PtRh electrodes. A study using DEMS and in-situ FTIR techniques," J. Phys. Chem., vol. 106, pp. 9825-9830, (2002).
De Souza et al., "Performance of a co-electrodeposited Pt-Ru electrode for the electro-oxidation of ethanol studied by an in-situ FTIR spectroscopy," J. Electroanal. Chemistry, vol. 420, pp. 17-20, (1997).
De Vooys et al., "The role of adsorbates in electrochemical oxidation of ammonia on noble and transition metal electrodes," J. Electroanal. Chemistry, vol. 506, pp. 127-137, (2001).
Despic et al., "Kinetics of electrochemical oxidation of ammonia in alkaline solution," Electrochim. Acta, vol. 11, No. 8, pp. 997-1005, (1966).
EMTEC Hydrogen Program 2005 RFP Round 2—Phase 1 Proposal Application Forms—Botte, Gerardine G., Electrochemical coal gasification with novel electrodes, dated Jan. 12, 2005.
Fujiwara et al., "Ethanol oxidation of PtRu electrodes studied by differential electrochemical mass spectrometry," J. Electroanal. Chemistry, vol. 472, pp. 120-125, (1999).
Georgoliois et al., "Pt electrodeposition on PAN-based carbon fibres," J. Electroanal. Chem., vol. 264, pp. 235-245, (1989).
Gerischer et al., "Untersuchungen zur anodischen oxidation von ammoniak an platin-elektroden," J. Electroanal. Chemistry, vol. 25, pp. 421-433, (1970). (English summary at end of article).

Gonzalez et al., "Electro-oxidation of Ammonia on Carbon Fibers," Abstract 566, 206th Electrochemical Society Conference Meeting, Oct. 3-8, 2004, published before meeting.
Gonzalez et al., "Electro-oxidation of Ammonia on Carbon Fibers," PowerPoint Presentation given at 206th Electrochemical Society Conference Meeting, Oct. 3-8, 2004, presented on Oct. 7, 2004.
Gootzen et al., "A DEMS and cyclic voltammetry study of NH3 oxidation on platinized platinum," Electrochim. Acta, vol. 43, pp. 1851-1861, (1998).
Gueneau De Mussy et al., "Characterisation and behavior of Ti/TiO2/noble metal anodes," Electrochimica Acta, vol. 48, pp. 1131-1141, (2003).
Hu et al., "Electro-oxidation of ammonia on different Ni alloy electrodes," Abstract 57, 204th Electrochemical Society Conference Meeting, Orlando, Florida, Oct. 12-16, 2003, published before meeting.
Jin et al., "Feasibility of hydrogen production from coal electrolysis at intermediate temperatures," Journal of Power Sources, vol. 171, pp. 826-834, (207), Available online Jul. 1, 2007.
Katan et al., "Current efficiences for the anodic oxidation of ammonia in potassium hydroxide solution," J. Electrochem. Soc., vol. 110(9), pp. 1022-1023, (1963).
Kawase et al., "Effects of NH3 and Nox on the performance of MCFCs," Journal of Power Sources, vol. 104, pp. 265-271, (2002).
Kim et al., "Electrolytic decomposition of ammonia to nitrogen in a multi-cell-stacked electrolyzer with a self-pH-adjustment function," J. Applied Electrochemistry, vol. 36, pp. 1415-1426, (2006).
Krueter et al., "Electrolysis: the important energy transformer in a world of sustainable energy," International Journal of Hydrogen Energy, vol. 23, No. 8, pp. 661-666, (Aug. 1998).
Lamy-Pitara et al., "Platinum modified by electrochemical deposition of adatoms," Applied Catalysis A, vol. 149, pp. 49-87, (1997).
Liu et al., "Array membrane electrode assemblies for high throughput screening of direct methanol fuel cell anode catalysts," J. Electroanalytical Chem., vol. 535, pp. 49-55, (2002).
Lopez De Mishima et al., "Electrochemical oxidation of ammonia in alkaline solutions: its application to an amperometric sensor," Electrochimica Acta, vol. 43, No. 3, pp. 395-404, (1998).
Mahe et al., "Surface modification of titanium substrates for the preparation of noble metal coated anodes," Electrochimica Acta, vol. 46, pp. 629-636, (2000).
Marincic et al., "Electro-oxidation of ammonia in waste water," Journal of Applied Electrochemistry, vol. 8, pp. 333-345, (1978).
Marquez et al., "Experimental and theoretical investigation of the electrolysis of ethanol for fuel cell applications," Abstract 993, 204th Electrochemical Society Conference Meeting, Orlando, Florida, Oct. 12-16, 2003, published before meeting.
Marquez et al., "Investigation of the Electro-oxidation of Ethanol on Different Alloys," Abstract 567, 206th Electrochemical Society Conference Meeting, Oct. 3-8, 2004, published before meeting.
Marquez et al., "Theoretical Investigations of NIYSZ in the presence of H2S," Electrochemical and Solid State Ltrs, vol. 9(3), pp. A163-A166, (2006).
Marquez et al., "Theoretical Investigations of the Electro-oxidation of Ammonia," Abstract 2000, 206th Electrochemical Society Conference Meeting, Oct. 3-8, 2004, published before meeting.
Marquez et al., "Theoretical Investigations of the Electro-oxidation of Ammonia," PowerPoint Presentation given at 206th Electrochemical Society Conference Meeting, Oct. 3-8, 2004, presented on Oct. 7, 2004.
Marquez et al., "Theoretical Investigations of the Solid Oxide Fuel Cell Anode," PowerPoint Presentation given at 206th Electrochemical Society Conference Meeting, Oct. 3-8, 2004, presented on Oct. 7, 2004.
Marquez et al., "Theoretical Investigations of the Solide Oxide Fuel Cell Anode," Abstract 1982, 206th Electrochemical Society Conference Meeting, Oct. 3-8, 2004, published before meeting.
Marrese, "Preparation of Strongly Adherent Platinum Black Coatings," Anal. Chem., vol. 59, pp. 217-218, (1987).
McKee et al., "Improved electrocatalysts for ammonia fuel cell anodes," J. Electrochem. Soc., vol. 116, pp. 562-568, (1969).

(56) References Cited

OTHER PUBLICATIONS

Miles et al., "The Oxygen Evolution Reaction on Platinum, Iridium, Ruthenium and Their Alloys at 80° C. in Acid Solutions," Electrochimica Acta, vol. 23, pp. 521-552, (1978).

Nart et al., "Reactivity of ethanol on platinum and platinum-rhodium bimetallic electrodes," 225th ACS National Meeting, New Orleans, Louisiana, Mar. 23-27, 2003.

Oswin et al., "The anodic oxidation of ammonia at platinum black electrodes in aqueous KOH electrolyte," Canadian J. Chem., vol. 41(7), pp. 1686-1694, (1963).

Patil et al., "Electrooxidation of coal slurries on different electrode materials," Abstract 565, 206th Electrochemical Society Conference Meeting, Oct. 3-8, 2004, published before meeting.

Patil et al., "Electrooxidation of coal slurries on different electrode materials," Journal of Power Sources, vol. 158, pp. 368-377, (2006).

Patil et al., "Evaluation of different electrode materials for the electro-oxidation of coal slurries for hydrogen production," Abstract 682, 205th Electrochemical Society Conference Meeting, May 9-13, 2004. (First publicly available Feb. 12, 2004).

Patil et al., "Investigation of Electrode kinetics of the Electro-oxidation of Coal Slurries," PowerPoint Presentation given at 206th Electrochemical Society Conference Meeting, Oct. 3-8, 2004, presented on Oct. 7, 2004.

Reddington et al., "Combinatorial discovery of and optimization of new electrocatalysts," Combinatorial Chemistry: A Practical Approach (2000), H. Fenniri, Ed., Oxford University Press, Oxford, UK, pp. 401-420.

Sasaki et al., "Oxidation and adsorption of ammonia on a platinized platinum electrode," J. Electrochem. Soc., vol. 117, pp. 758-762, (1970).

Sathe et al., "Assessment of coal and graphite electrolysis on carbon fiber electrodes," Journal of Power Sources, vol. 161, pp. 513-523, (2006).

Sathe et al., "Assessment of coal and graphite electrolysis," Abstract 559, 206th Electrochemical Society Conference Meeting, Oct. 3-8, 2004, published before meeting.

Sathe et al., "Assessment of coal and graphite electrolysis," PowerPoint Presentation given at 206th Electrochemical Society Conference Meeting, Oct. 3-8, 2004, presented on Oct. 6, 2004.

Schmidt et al., "Electrochemical reactivity of ethanol on porous PT and PtRu: oxidation/reduction reactions in 1 M HClO4," J. Phys. Chem., vol. 100, pp. 17901-17908, (1996).

Simons et al., "The performance of direct ammonia fuel cells," J. Electrochem. Soc., vol. 115, pp. 556-561, (1969).

Ureta-Zanartu et al., "Electrocatalytic oxidation of ethylene glycol in 0.5 M H2SO4 and 0.5 M NaOH solutions at a bimetallic deposited electrode," Jour. Electroanalytical Chem., vol. 405, pp. 159-167, (1996).

Vidal-Iglesias et al., "Selective electrocatalysis of ammonia oxidation on Pt(100) sites in alkaline medium," Electrochemistry Communications, vol. 5(1), pp. 22-26, (2003).

Vitse et al., "Ammonia Electrolysis to Power a Hydrogen Fuel Cell: Case Study of an Integrated System," Abstract 1469, 206th Electrochemical Society Conference Meeting, Oct. 3-8, 2004, published before meeting.

Vitse et al., "Analysis of Electro-kinetics of Ammonia Oxidation in Alkaline Media by Mathematical Modeling," Abstract 2306, 206th Electrochemical Society Conference Meeting, Oct. 3-8, 2004, published before meeting.

Vitse et al., "Electro-oxidation of Ammonia and its Applications," PowerPoint Presentation given at 204th Electrochemical Society Conference Meeting, Oct. 12-16, 2003.

Vitse et al., "Electro-oxidation of ammonia for fuel cell application," Abstract 1027, 204th Electrochemical Society Conference Meeting, Orlando, Florida, Oct. 12-16, 2003, published before meeting.

Vitse et al., "Modeling Lithium Intercalation in a Manganese Dioxide Particle," Abstract 383, 204th Electrochemical Society Conference Meeting, Oct. 12-16, 2003, published before meeting.

Vitse et al., "On the use of ammonia electrolysis for hydrogen production," Journal of Power Sources, vol. 142, pp. 18-26, (2005).

Wasmus et al., "DEMS-cyclic voltammetry investigation of the electrochemistry of nitrogen compounds in 0.5 M potassium hydroxide," Electrochim. Acta, vol. 39, pp. 23-31, (1994).

Wynveen, "Preliminary appraisal of the ammonia fuel cell system," Chapter 12, Fuel Cells, Young, Editor, vol. 2, pp. 153-167, (1963).

U.S. Patent and Trademark Office, Final Office Action in corresponding U.S. Appl. No. 12/090,057, mailed Mar. 13, 2013, 11 pp.

U.S. Patent and Trademark Office, Non-Final Office Action in corresponding U.S. Appl. No. 12/090,057, mailed Oct. 12, 2012, 11 pp.

US 8,613,842 B2

LAYERED ELECTROCATALYST FOR OXIDATION OF AMMONIA AND ETHANOL

CROSS-REFERENCE TO RELATED APPLICATIONS

The present application is a divisional application of the non-provisional patent application Ser. No. 12/114,782 filed on May 4, 2008, which claims priority to the provisional application having application Ser. No. 60/916,222, which was filed on May 4, 2007; and the provisional application having the application Ser. No. 60/974,766, which was filed on Sep. 24, 2007, and was a continuation-in-part of the PCT application PCT/US2006/017641, which was filed on May 8, 2006 and in turn claimed priority to the provisional application having application Ser. No. 60/678,725, which was filed on May 6, 2005; and was a continuation-in-part of the non-provisional application having the application Ser. No. 10/962,894, which was filed on Oct. 12, 2004 and issued on Feb. 3, 2009 as U.S. Pat No. 7,485,211, and in turn claimed priority to the provisional application having application Ser. No. 60/510,473, which was filed on Oct. 10, 2003, the entirety of which are incorporated herein by reference.

FIELD

The present embodiments relate to a layered electrocatalyst useable for the electrochemical oxidation of ammonia, ethanol, or combinations thereof.

BACKGROUND

A need exists for a layered catalyst able to oxidize ammonia, ethanol, or combinations thereof in alkaline media continuously.

A further need exists for a layered catalyst that is useable as an electrode in electrochemical cells and fuel cells that overcomes difficulties relating to the positioning of the electrode due to surface blockage.

A need also exists for a layered electrocatalyst that provides a hard rate of performance for a carbon support.

The present embodiments meet these needs.

BRIEF DESCRIPTION OF THE DRAWINGS

The detailed description will be better understood in conjunction with the accompanying drawings as follows.

Figure 1:
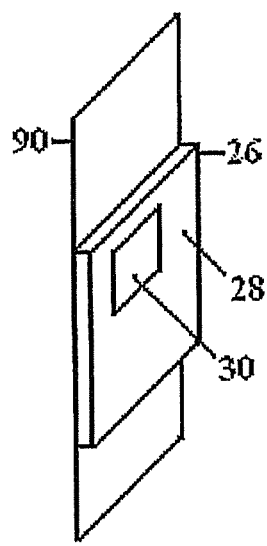
FIG. 1 depicts a diagram of an embodiment of the present layered electrocatalyst.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a layered electrocatalyst useable for the electrochemical oxidation of ammonia, ethanol, or combinations thereof.

Conventional hydrogen production is expensive, energy inefficient, and creates unwanted byproducts. The present layered electrocatalyst is useable as an electrode in electrochemical cells for evolving hydrogen through the oxidation of ammonia and/or ethanol.

The present layered electrocatalyst is further useable as an electrode in alkaline-ammonia and/or ethanol fuel cells for the generation of energy.

Additionally, the present layered electrocatalyst is useable as a sensor for detecting trace quantities of ammonia, ethanol, or combinations thereof, which can include Millimolar quantities, parts per million, or even parts per billion.

The present layered catalyst is useable to oxidize ammonia, ethanol, or combinations thereof in an alkaline media.

The present layered catalyst is useable to overcome the costs and difficulties associated with the production of hydrogen when used in an ammonia and/or ethanol electrochemical cell, for use in fuel cells and for other uses, by enabling continuous, controllable evolution of hydrogen through the oxidation of plentiful and inexpensive feedstocks that include ammonia and/or ethanol.

Plating of carbon fibers, nano-tubes, and other carbon supports is typically difficult, primarily due to the relatively low electronic conductivity of these materials, which can also cause a poor coating of the surface by plating metals. A poor surface coating can be easily removed. The electronic conductivity of the carbon supports decreases along the length of the support from the electrical connection. Therefore, the furthest point of contact to the electric connection transfers a low current when compared to the closest point to the electric contact.

The present layered electrocatalyst possesses uniform current distribution, exhibits enhanced adherence and durability of coating, and overcomes the surface coverage affects of conventional electrodes, leaving a clean active surface area for a reaction.

It was believed that the surface blockage caused during ammonia electrolysis in alkaline medium was due to the presence of elemental Nitrogen, according to the mechanism proposed by Gerisher:

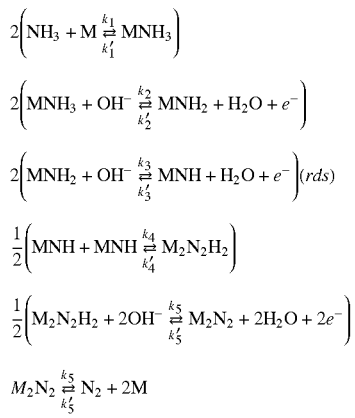

Deactivation Reaction:

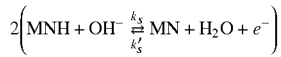

where M represents an active site on the electrode.

The present layered electrocatalyst incorporates the demonstrations of two independent methods indicating that the proposed mechanism by peripher is not correct, and that OH needs to be adsorbed on an electrode using the layered electrocatalyst for the reactions to take place. Furthermore, the electrode is deactivated by the OH adsorbed at the active sites.

Results from molecular modeling indicate that the adsorption of OH on an active Pt site is strong (chemisorption) and can be represented by the following reaction:

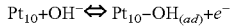

Figure 3:
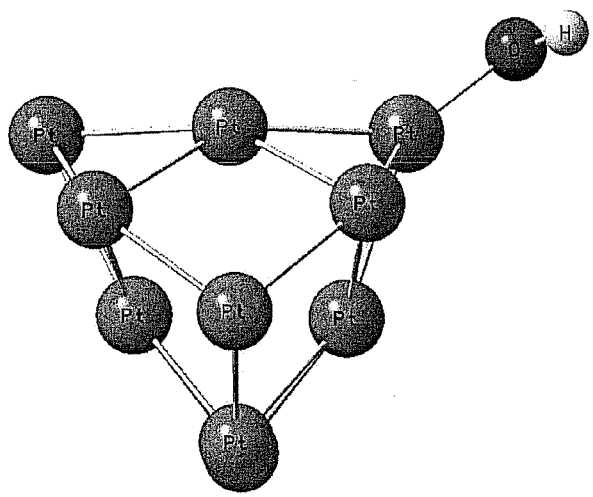
FIG. 3 shows adsorption of OH on a Platinum cluster.

FIG. 3 shows a bond between OH and a platinum cluster. The system was modeled using Density functional Methods. The computations were performed using the B3PW91 and LANL2DZ method and basis set, respectively. The binding energy for the Pt—OH cluster is high with a value of −133.24 Kcal/mol, which confirms the chemisorption of OH on a Pt cluster active site.

Additionally, results from microscopic modeling as well as experimental results on a rotating disk electrode (RDE) indicate that the adsorption of OH is strong and responsible for the deactivation of the catalyst.

Figure 4:
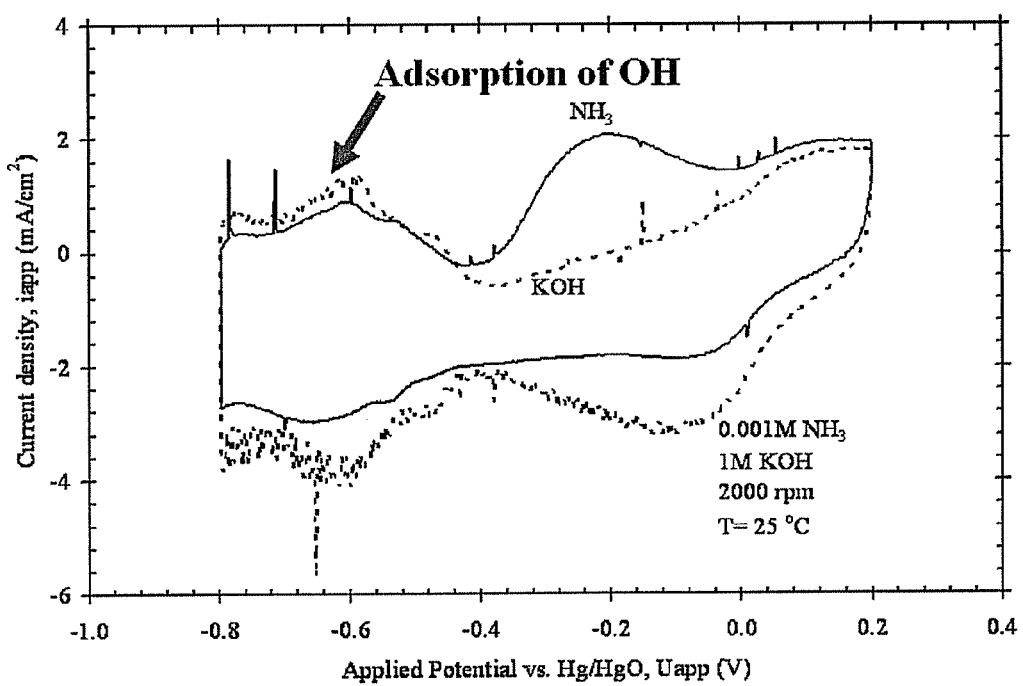
FIG. 4 shows experimental results of the electro-oxidation of ammonia on a Pt electrode, using a rotating disk electrode.

FIG. 4 compares the baseline of a KOH solution with the same solution in the presence of OH. The curves indicate that the first oxidation peaks that appear at about −0.7 V vs Hg/HgO electrode had to do with the electro-adsorption of OH.

Figure 5:
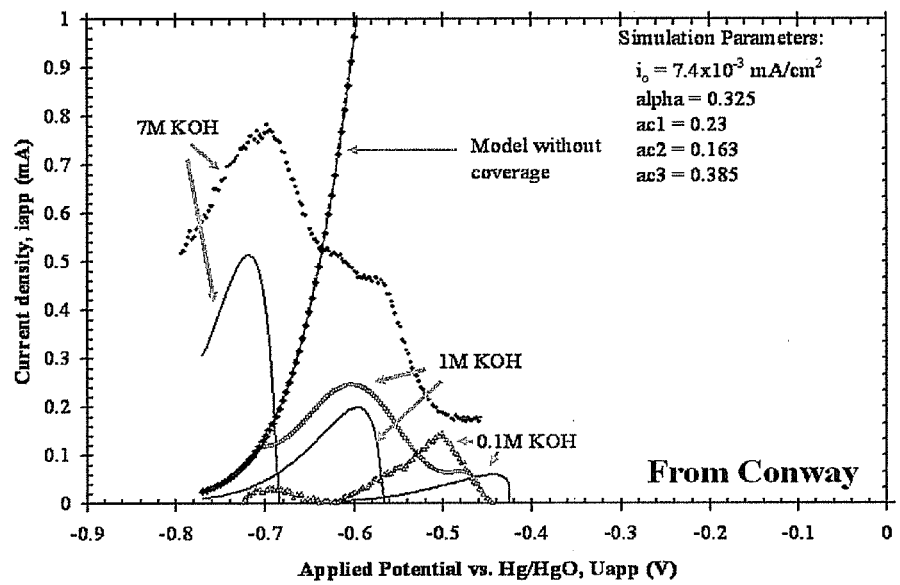
FIG. 5 shows results of microscopic modeling of the electro-adsorption of OH, indicating that if the sites were available, the adsorption of OH would continue producing higher oxidation currents

FIG. 5 shows a comparison of the predicted results (by microscopic modeling) with the experimental results for the electro-adsorption of OH. The results indicate that the model predict the experimental results fairly well. Furthermore, an expression for the surface blockage due to the adsorption of OH at the surface of the electrode was developed (notice that the active sites for reaction theta decay with the applied potential due to adsorbates). If the surface were clean (see results Model without coverage), the electro-adsorption of OH would continue even at higher potentials and faster.

Compiling the experimental results with the modeling results the following mechanism for the electro-oxidation of ammonia in alkaline medium is proposed: First the adsorption of OH takes place. As the ammonia molecule approaches the electrode, it is also adsorbed on the surface. Through the oxidation of ammonia, some OH adsorbates are released from the surface in the form of water molecule. However, since the adsoiption of OH is stronger and the OH ions move faster to the surface of the electrode, they are deactivated increasing potential. There will be a competition on the electrode between the adsorption of OH and NH3.

Figure 6:
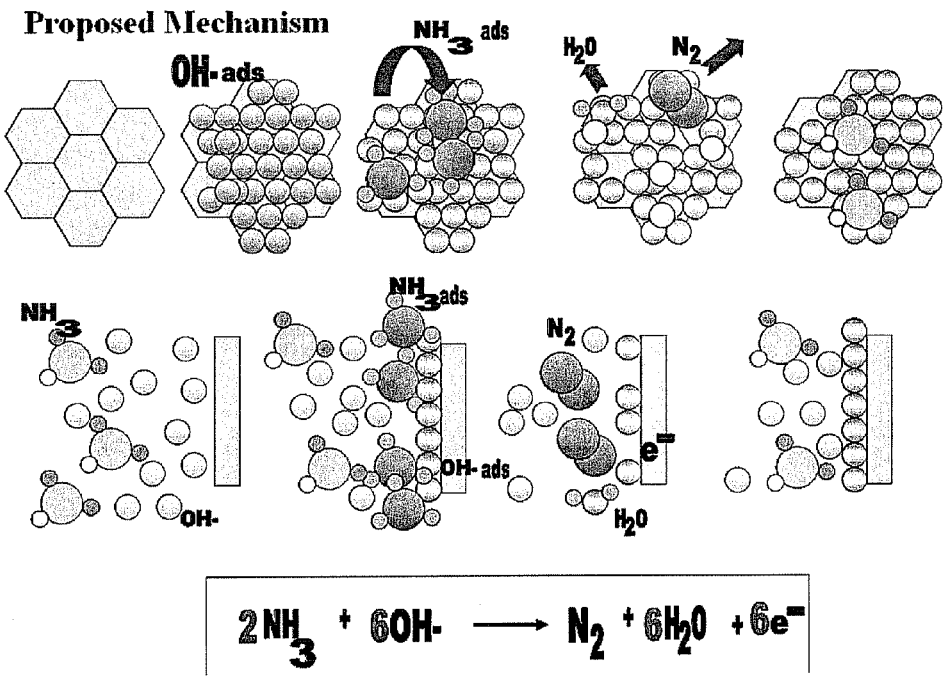
FIG. 6 shows a representation of the electro-oxidation mechanism of ammonia on a Pt electrode. As NH3 reaches the Pt surface it competes with the OH" electro-adsorption. Since the Electro-adsorption of OH" is faster on Pt the active sites of the electrode get saturated with the OH adsorbates causing deactivation of the electrode.

The results of the mechanism are summarized on the proposed reactions given below, as well as FIG. 6.

 (1)

 (2)

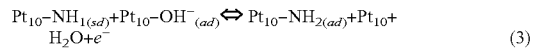 (3)

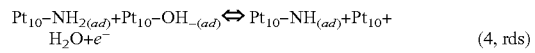 (4, rds)

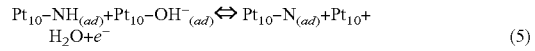 (5)

 (6)

 (7)

This mechanism can be extended to the electro-oxidation of other chemicals in alkaline solution at low potentials (negative vs. standard hydrogen electrode (SHE)). For example, the mechanism has been extended to the electro-oxidation of ethanol. The proposed mechanism clearly defines the expectations for the design of better electrodes using the present layered electrocatalyst: the materials used should enhance the adsorption of NH3 and/or ethanol, or other chemicals of interest. The proposed mechanism can also enhance the electrolysis of water in alkaline medium. The present electrocatalyst combines two materials. One of the materials should be more likely to be adsorbed by OH than the other, which will leave active sites available for the electro-oxidation of the interested chemicals, such as $NH_3$ and/or ethanol.

The present layered electrocatalyst includes a carbon support integrated with a conductive metal. The carbon support can include carbon fibers, carbon tubes, carbon microtubes, carbon microspheres, nano-sized carbon fibers, nano-sized carbon tubes, carbon sheets, or combinations thereof.

Carbon fibers can include woven or non-woven carbon fibers, that are polymeric or other types of fibers. For example, a bundle of polyacrylonitrile carbon fibers could be used as a carbon support. Solid or hollow nano-sized carbon fibers, having a diameter less than 200 nanometers, can also be useable. Bundles of 6000 or more carbon fibers are contemplated, having an overall diameter up to or exceeding 7 micrometers.

Carbon microspheres can include nano-sized Buckyball supports, such as free standing spheres of carbon atoms having plating on the inside or outside, having a diameter less than 200 nanometers. Crushed and/or graded microspheres created from the grinding or milling of carbon, such as Vulcan 52, are also useable.

Carbon sheets can include carbon paper, such as that made by Toray™, having a thickness of 200 nanometers or less. Useable carbon sheets can be continuous, perforated, or partially perforated. The perforations can have diameters ranging from 1 to 50 nanometers.

Carbon tubes can include any type of carbon tube, such as nano-CAPP or nano-CPT, carbon tubes made by Pyrograf®, or other similar carbon tubes. For example, carbon tubes having a diameter ranging from 100 to 200 nanometers and a length ranging from 3,000 to 100,000 nanometers could be used.

The carbon support can be integrated with the conductive metal by wrapping the carbon support around or within the metal, such as by wrapping carbon fibers within titanium gauze. The carbon support could also be bound to a conductive metal, such as by attaching carbon tubes to tungsten using a binder, or attaching a carbon sheet that includes a binder to a plate of titanium.

Useable conductive metals can include any metallic conductor, such as titanium, nickel, stainless steel, or cobalt. It is contemplated that the conductive metal integrated with the carbon support can have an inability or reduced ability to bind with metal plating layers used to form the present layered electrocatalyst.

The present layered electrocatalyst includes at least one first metal plating layer deposited, at least partially, on the carbon support. The first metal plating layer is contemplated to be active to hydroxide adsorption, and inactive to a target species, such as ammonia, ethanol, or combinations thereof.

In an embodiment, the first metal plating layer can include rhodium, rubidium, iridium, rhenium, platinum, palladium, copper, silver, gold, nickel, iron, or combinations thereof.

The first metal plating layer is contemplated to have a thickness ranging from 10 nanometers to 10 microns. For example, the first metal plating layer can have a loading of 2 mg/cm provided to a carbon fiber support.

One or more second metal plating layers are at least partially deposited on the first metal plating layer. The one or more second metal plating layers are contemplated to be active to the target species. The second metal plating layer can also have a thickness ranging from 10 nanometers to 10 microns. Both metal plating layers can provide a total loading to a carbon fiber support ranging from 4 mg/cm to 10 mg/cm.

In an embodiment, the second metal plating layer can include platinum, iridium, or combinations thereof. The platinum and iridium can be present in a ratio ranging from 99.99: 0.01 to 50:50 platinum to iridium, respectively. For example, the second metal plating layer could have 95:5 platinum to iridium, 70:30 platinum to iridium, 80:20 platinum to iridium, or 75:25 platinum to iridium.

One or both of the metal plating layers can partially or wholly cover the carbon support. One or both of the metal plating layers can be perforated. Additionally, one or both of the metal layers can have a varying thickness. The first metal plating layer, the second metal plating layer, or combinations thereof, can be a continuous layer.

For example, the second metal plating layer can have a first thickness ranging from 0 to 500 nanometers on a first portion of the carbon support, and a second thickness ranging from 0 to 500 nanometers on a second portion of the carbon support.

The resulting layered electrocatalyst is usable as an anode electrode within an electrochemical cell for evolving hydrogen, as an anode electrode within an alkaline ammonia and/or ethanol fuel cell, and as a sensor for detecting trace amounts of ammonia and/or ethanol.

The present embodiments also relate to a sensor for detecting ammonia, ethanol, or combinations thereof, formed using the present layered catalyst.

The sensor includes a carbon support integrated with a conductive metal, as described previously.

At least one active metal plating layer is at least partially deposited on the carbon support. The active metal plating layer can have a thickness ranging from 10 nanometers to 10 microns, and is contemplated to be active to ammonia, ethanol, or combinations thereof.

The active metal plating layer is thereby useable to detect ammonia, ethanol, or combinations thereof at a concentration of 0.01 Millimolar or more.

In an embodiment, the sensor can include at least one additional metal plating layer at least partially deposited on the carbon support. The additional metal plating layer can have a thickness ranging from 10 nanometers to 10 microns.

It is contemplated that the additional metal plating layer is active to hydroxide adsorption, and inactive to the ammonia, ethanol, or combinations thereof.

The adsorption of hydroxide by the sensor increases the efficiency of the detection of ammonia and/or ethanol. Use of an additional metal plating layer to adsorb hydroxide further increases the sensitivity of the sensor, lowering the detection limit of the sensor to as little as 1 ppb ammonia and/or ethanol.

The active metal plating layer of the sensor can include rhodium, rubidium, iridium, rhenium, platinum, palladium, copper, silver, gold, nickel, iron, or combinations thereof. The additional metal plating layer can include platinum, iridium, or combinations thereof. The carbon support can include comprises carbon fibers, carbon tubes, carbon microtubes, carbon microspheres, nano-sized carbon fibers, nano-sized carbon tubes, carbon sheets, or combinations thereof.

The sensor operates by producing a potential proportional to the concentration of ammonia, ethanol, or combinations thereof when an electric current is applied to toe sensor.

The present layered electrocatalyst can be made using the following method:

A carbon support can be bound with a conductive metal, such that the entirety of the carbon support is in contact with the conductive metal. For example, a sheet of carbon could be adhered to a plate of nickel, or a bundle of carbon fibers could be wrapped around a piece of titanium gauze.

The present layered electrocatalyst can be created without binding the carbon support to a conductive metal, however use of the conductive metal improves uniform deposition of the plated metal layers on the carbon support. Without binding the carbon support to the conductive metal, uneven distribution plated metal layers can occur, and impurities can develop in the plated metal layers.

After plating the carbon support to form the layered electrocatalyst, it is contemplated that the conductive metal can be removed. For example, a porous carbon paper could be adhered to a titanium plate during plating, allowing selected plating metals that do not bond with titanium to uniformly coat both sides of the carbon paper. The carbon paper could then be removed from the titanium plate and used as an electrode.

To plate the carbon support, the bound carbon support is soaked in an electroplating bath having an anode at least twice the size of the bound carbon support while an electrical current is applied to the bound carbon support. In an embodiment, the anode can include a foil formed from platinum, ruthenium, iridium, or alloys thereof.

It is contemplated that the anode can include, at least in part, the first plating metal that is to be deposited on the bound carbon support.

The electroplating bath can include an aqueous carrier with an electrolyte and a salt of a first plating metal in the aqueous carrier. The salt of the first plating metal is contemplated to have a mass three to five times the mass of the first plating metal to be deposited on the bound carbon support. The salt of the first plating metal can be a halide salt.

The electrolyte can be acidic, such as hydrochloric acid or boric acid, or the electrolyte can be basic. In an embodiment, the electrolyte can have a concentration ranging from 1M to 5M.

The electroplating bath can have a temperature ranging from 25 degrees Centigrade to 80 degrees Centigrade, depending on the selected plating metals, the electric current, and the desired mass of plating metal to be deposited on the bound carbon support.

The electroplating bath can include a standard hydrogen electrode. The electric current can provide a voltage potential ranging from −0.2 volts to −1.0 volts versus the standard hydrogen electrode.

The electric current can be controlled to regulate the plating of the layered electrocatalyst. The current can be regulated to maintain constant potential, constant current, staircase current, or pulse current.

In an embodiment, constant stirring can be provided to the electroplating bath. For example, a magnetic stirrer can be used to provide constant stirring of 60 revolutions per minute, or more.

In an embodiment, the carbon support can be pretreated to remove at least a portion of a coating on the carbon support, prior to binding the carbon support with the conductive metal. Pretreatment can include degreasing the carbon support, such as by using acetone or another solvent.

The loading of the first plating metal on the carbon support can be measured to determine the mass of the first plating metal that has been deposited.

In an embodiment, the layered electrocatalyst can be soaked in a second electroplating bath while providing a current, for providing one or more layers of a second plating metal to the electrocatalyst.

The second electroplating bath can have a second anode at least twice the size of the layered electrocatalyst, and can include a second aqueous carrier with a second electrolyte, and a second salt of a second plating metal. The second salt of the second plating metal has a mass three to five times the mass of the second plating metal to be deposited on the layered electrocatalyst.

It is contemplated that the thickness and coverage of each plated metal layer can be varied to accommodate the oxidation of a specified feedstock by the layered electrocatalyst. The present layered catalyst can thereby be customized to meet the needs of users.

Figure 7:
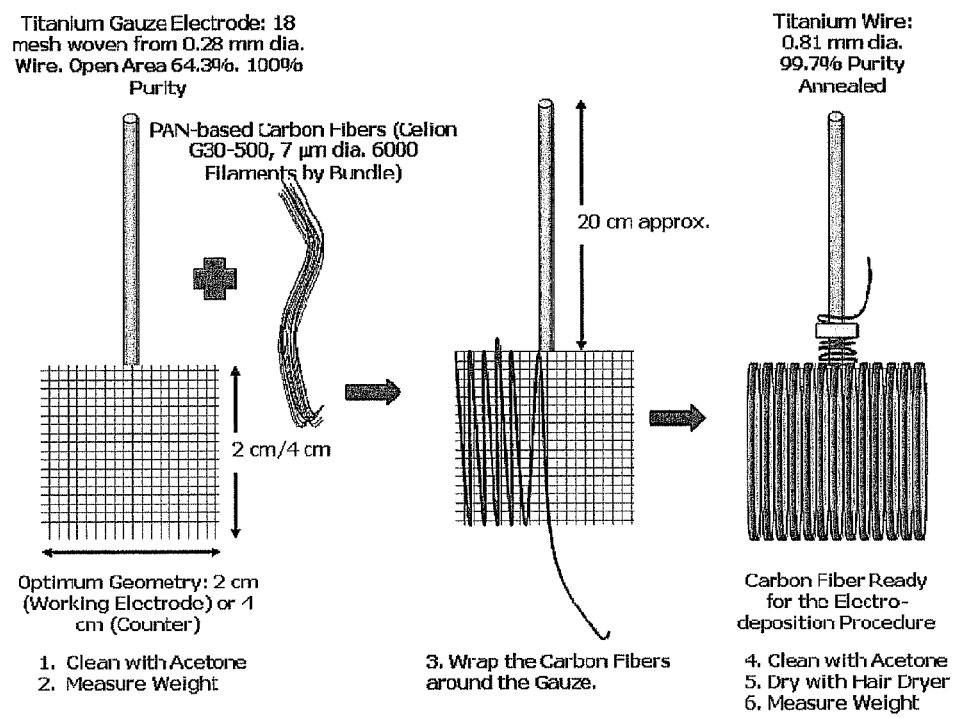
FIG. 7 shows a schematic representation of the procedure used to increase the electronic conductivity of the carbon fibers during plating and operation.

FIG. 7 shows a schematic representation of the procedure used to increase the electronic conductivity of the carbon fibers during plating (and also during the operation of the electrode). The fibers were wrapped on a titanium gauze, and were therefore in electric contact with the metal at different points. This improvement allowed an easy and homogenous plating of the fibers at any point. The electronic conductivity at any point in the fiber was the same as the electronic conductivity of the Ti gauze.

Figure 8:
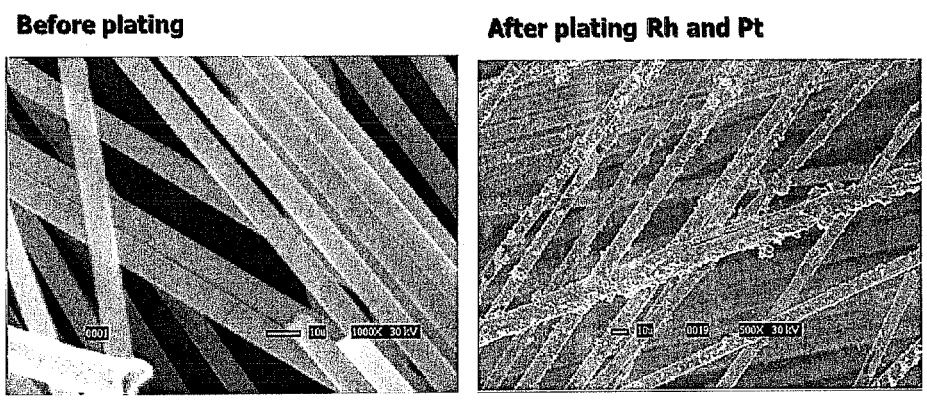
FIG. 8 shows SEM photographs of the carbon fibers before plating and after plating.

FIG. 8 shows a Scanning Electron Microscope photograph of the electrode before plating and after plating. A first layer of Rh was deposited on the electrode to increase the electronic conductivity of the fibers and to serve as a free substrate for the adsorption of OH. (OH has more affinity for Rh than for Pt). A second layer consisting of Pt was plated on the electrode. The Pt layer did not cover all the Rh sites, leaving the Rh surface to act as a preferred OH adsorbent.

Figure 9:
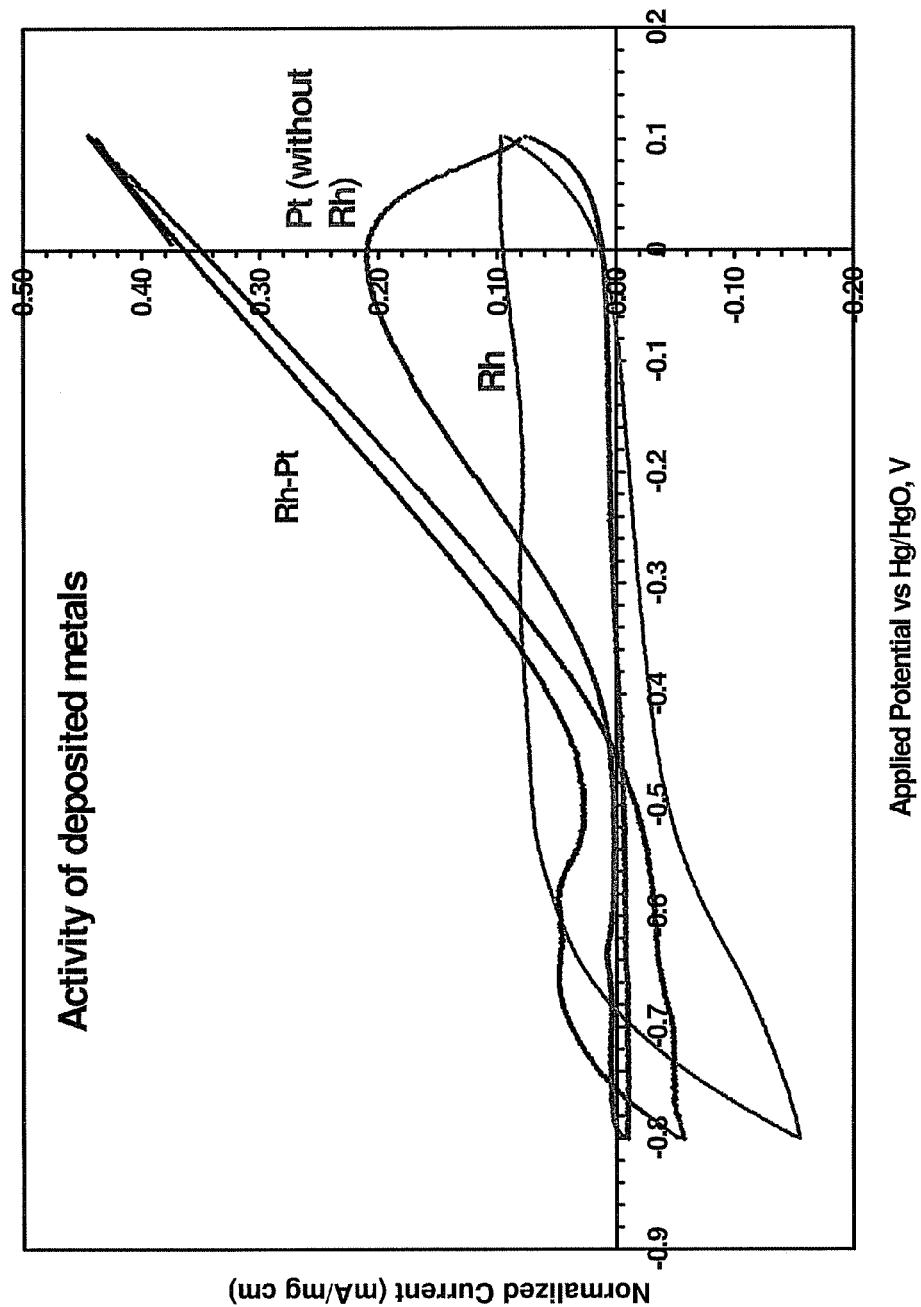
FIG. 9 shows cyclic voltammetry performance of 1M Ammonia and 1M KOH solution at 25° C., comparing the performance of the carbon fiber electrodes with different compositions.

FIG. 9 shows the cyclic voltammetry performance for the electro-oxidation of ammonia on different electrode compositions. Notice that the carbon fibers plated with only Rh are not active for the reaction, while when they are plated with only Pt, the electrode is active but it is victim of poisoning. On the other hand, when the electrode is made by plating in layers: first Rh is deposited and then a second layer consisting of Pt is deposited, the electrode keeps the activity. This is explained by the mechanism presented previously. FIG. 9 demonstrates that the proposed method or preparation of the electrode eliminates surface blockage difficulties.

Figure 10:
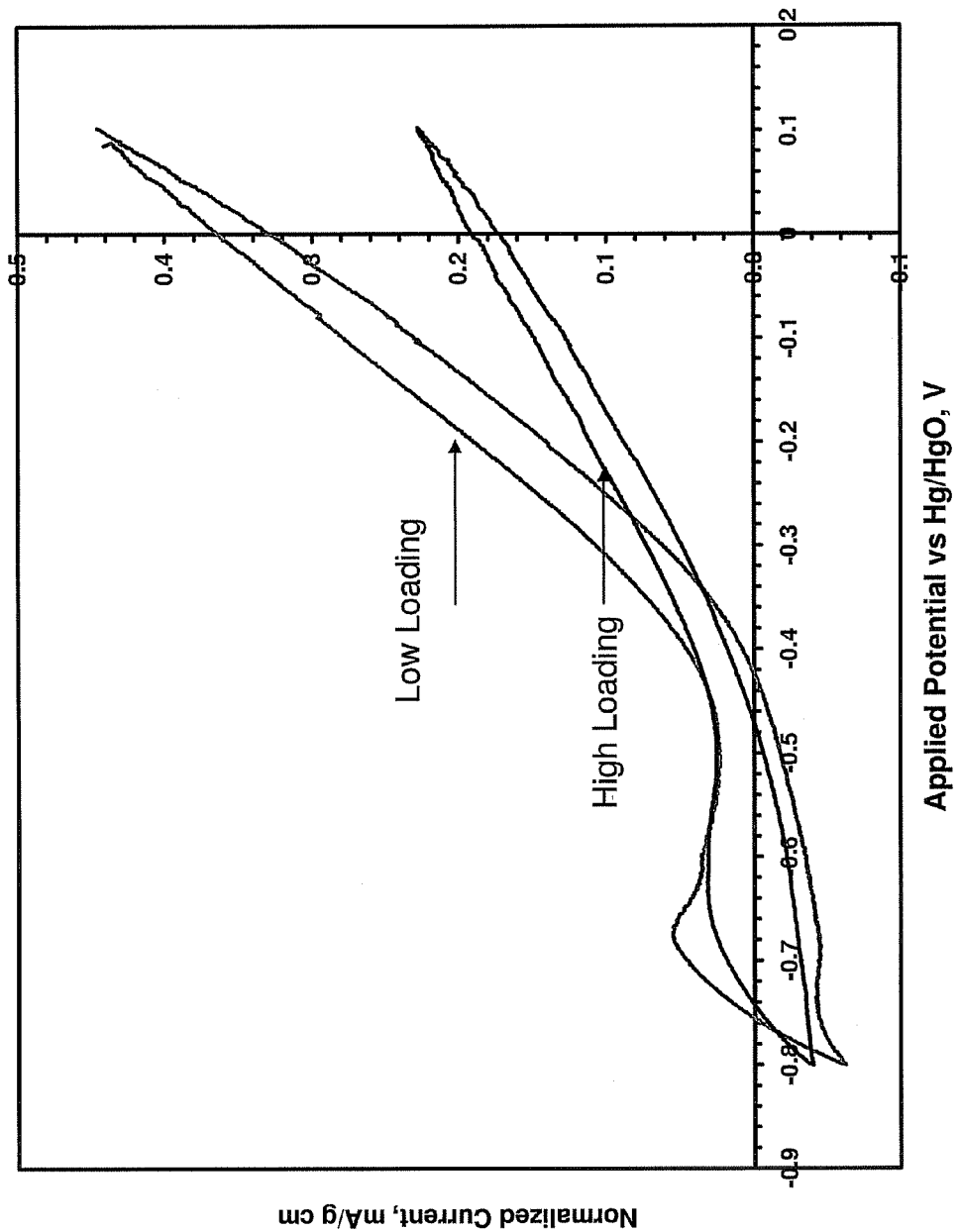
FIG. 10 shows cyclic voltammetry performance of 1M Ammonia and 1M KOH solution at 25° C., comparing the loading of the electrode, with low loading 5 mg of total metal/cm of carbon fiber and high loading 10 mg of metal/cm of carbon fiber.

FIG. 10 shows the effect of different total loading on the electro-oxidation of ammonia. The results indicate that the catalyst with the lowest loading is more efficient for the electro-oxidation of ammonia. This feature results in a more economical process owing to a lower expense related to the catalyst. Additional loading of the catalyst just causes the formation of layers over layers that do not take part in the reaction.

Figure 11:
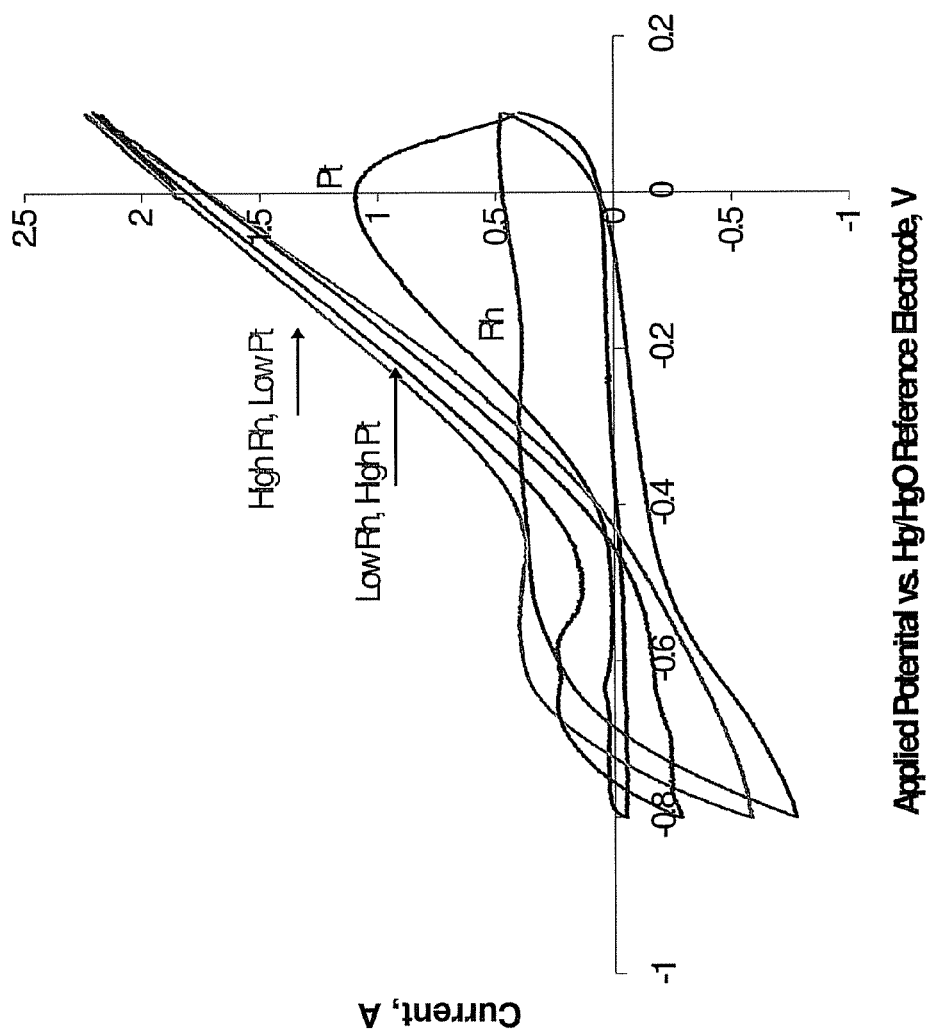
FIG. 11 shows cyclic voltammetry performance of 1M Ammonia and 1M KOH solution at 25° C., comparing differing electrode compositions at low loading of 5 mg of total metal/cm of fiber. Electrode compositions include High Rh, Low Pt (80% Rh, 20% Pt), and low Rh and high Pt (20% Rh, 80% Pt).

FIG. 11 illustrates the effect of the catalyst composition of the electro-oxidation of ammonia in alkaline solution. There is not a notable difference in the performance of the electrode due to the composition of the electrode. This lack of difference is due to the fact that as long as a first layer of Rh is plated on the electrode, surface blockage will be avoided. Additional plating of Pt would cause the growth of a Pt island (see SEM picture, FIG. 8), which is not completely active in the whole surface.

Figure 12:
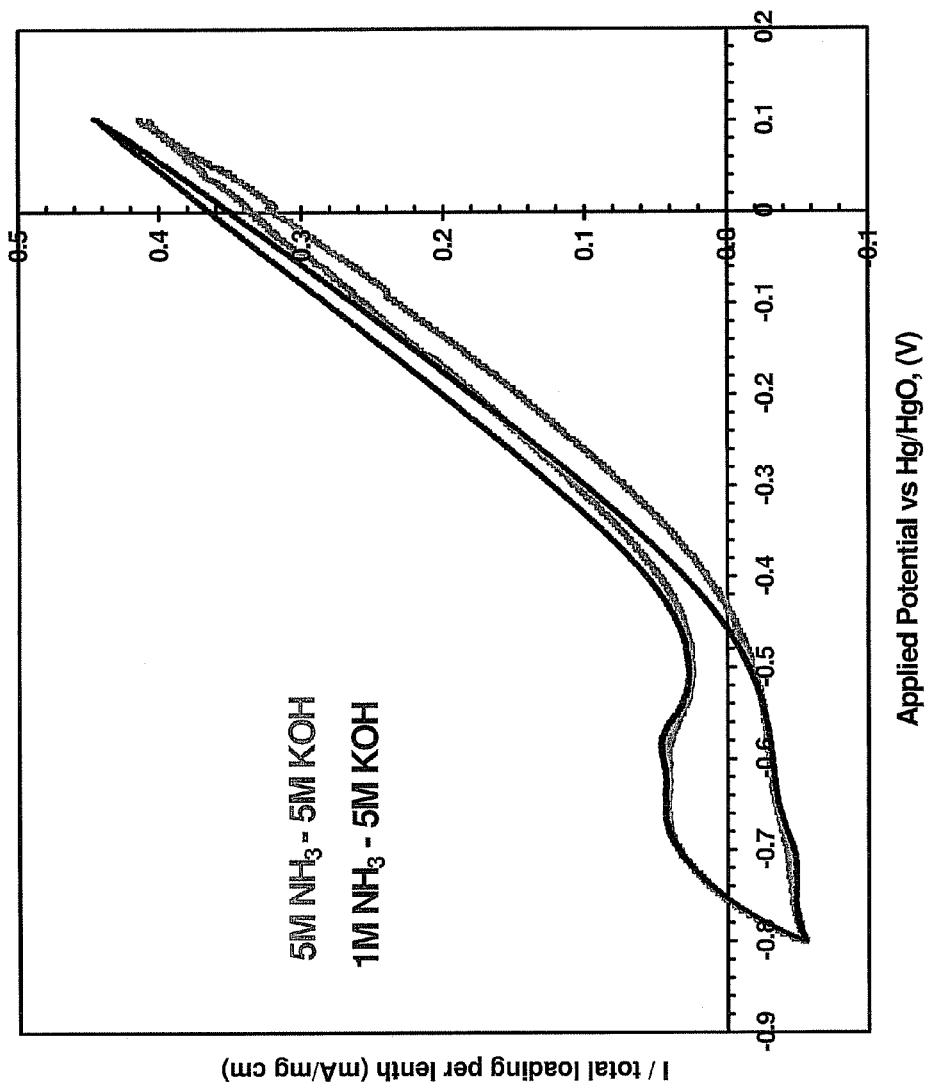
FIG. 12 shows cyclic voltammetry performance of 1M Ammonia and 1M KOH solution at 25° C., with differing ammonia concentration, indicating that the concentration of NH3 does not affect the kinetics of the electrode.

FIG. 12 shows the effect of ammonia concentration on the performance of the electrode. The effect of ammonia concentration is negligible on the electrode performance. This is due to the fact that the active Pt sites have already adsorbed the NH3 needed for a continuous reaction. Due to this feature, the present electrochemical cell is operable using only trace amounts of ammonia and/or ethanol.

Figure 13:
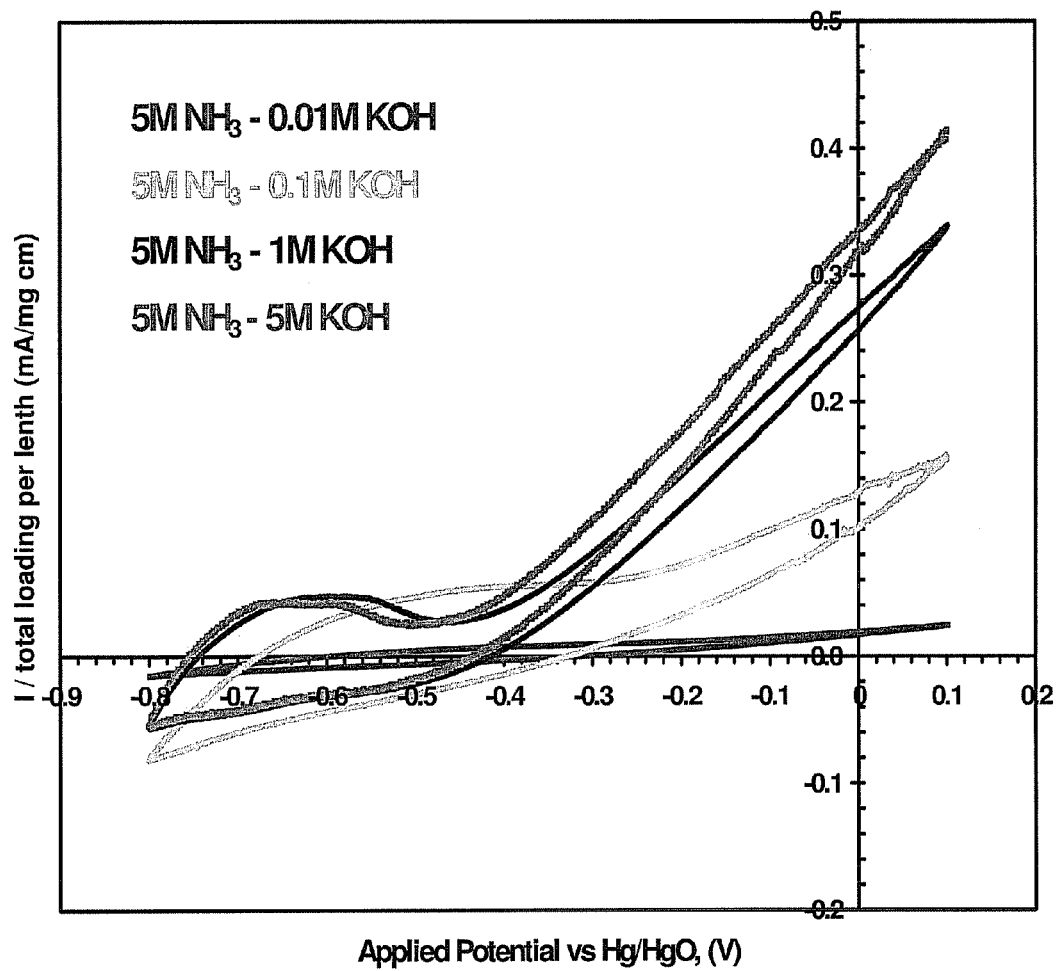
FIG. 13 shows cyclic voltammetry performance of Effect of solution at 25° C., with differing OH concentration, indicating that a higher the concentration of OH causes faster kinetics.

FIG. 13 depicts the effect of the concentration of OH on the electro-oxidation of ammonia. A larger concentration of OH causes a faster rate of reaction. The electrode maintains continuous activity, without poisoning, independent of the OH concentration.

Figure 14:
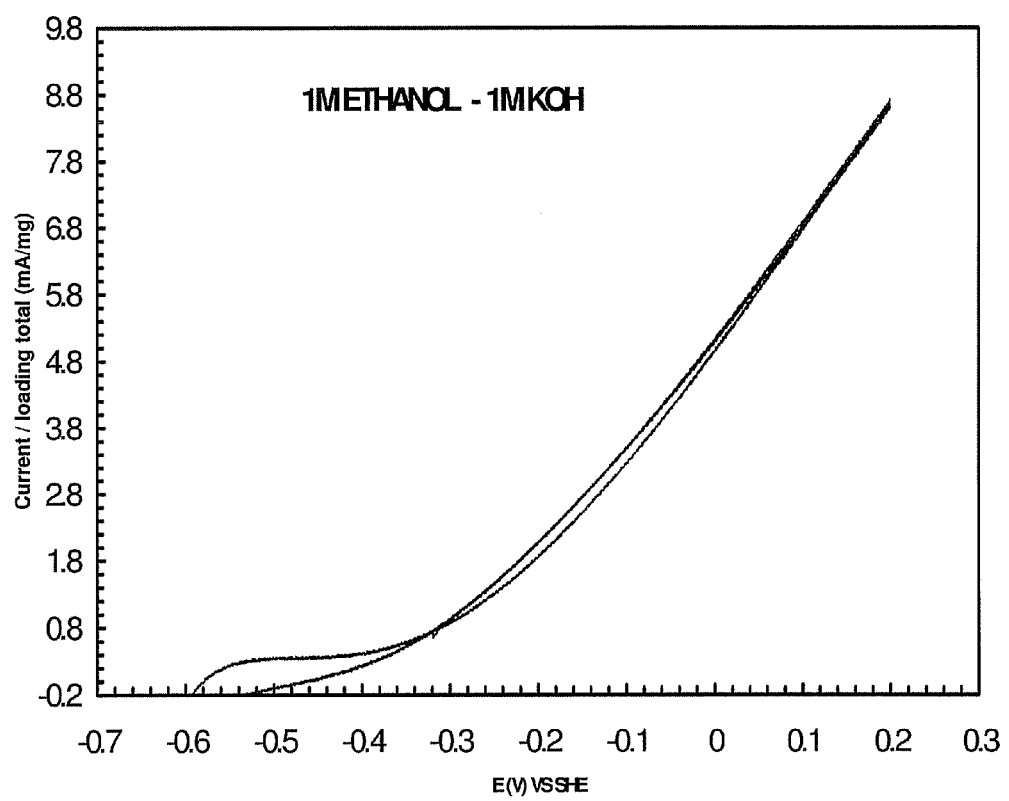
FIG. 14 shows cyclic voltammetry performance of 1M ethanol and 1M KOH solution at 25° C., indicating that the present electrochemical cell is also useable for the continuous oxidation of ethanol.

FIG. 14 shows the evaluation of the electrode for the electro-oxidation of ethanol. Continuous electro-oxidation of ethanol in alkaline medium is achieved without surface blockage. The present layered catalyst is thereby useable to oxidize ethanol, as well as ammonia.

The present layered electrocatalyst is contemplated to be useable at temperatures ranging from −50 degrees Centigrade to 200 degrees Centigrade. In an embodiment, the electrocatalyst can be usable from 20 degrees Centigrade to 70 degrees Centigrade. In another embodiment, the electrocatalyst is operable from 60 degrees Centigrade to 70 degrees Centigrade.

The present layered electrocatalyst can also be operable from 20 degrees Centigrade to 60 degrees Centigrade, from 30 degrees Centigrade to 70 degrees Centigrade, from 30 degrees Centigrade to 60 degrees Centigrade, or from 40 degrees Centigrade to 50 degrees Centigrade.

It is contemplated that in an embodiment, a higher pressure can be used, enabling the present layered electrocatalyst to be operable at higher temperatures. The present layered electrocatalyst is contemplated to be useable at pressures ranging from less than 1 atm to 10 atm.

The schematic for the construction of an electrode formed using the present layered electrocatalyst the electrode is known, then by proportionality, it can be known the length of the total fiber that is being used in each electrode.

Table II summarizes the general conditions of a plating bath useable to create the electrodes. During the entire plating procedure, the solution was mixed to enhance the transport of the species to the carbon support.

Table III shows examples of some electrode compositions, lengths, and loadings of active metals.

TABLE 1

Conditions for Electro-plating Technique in the Deposition of Different Metals on the Carbon Fibers and/or Carbon Nanotubes

| Metal Plated | Rhodium (Rh) | Platinum (Pt) | Nickel (Ni) |
|---|---|---|---|
| Position on the Electrode Surface: | First | Second | First |
| Geometry: | $2 \times 2$ cm$^2$ | $2 \times 2$ cm$^2$ | $4 \times 4$ cm$^2$ |
| Conditions of the Solution: | Total Volume: 250 ml | Total Volume: 250 ml | Total Volume: 500 ml |
| Composition of the Solution: | 1M HCl + Rhodium (III) Chloride (RhCl$_3$•XH$_2$O). Rh 38.5-45.5% (different compositions, depending on loadings) | 1M HCl + Hydrogen Hexachloroplatinate (IV) Hydrate, 99.9% (H$_2$PtCl$_6$•6H$_2$O) (different compositions, depending on loadings) | Watt's Bath: Nickel Sulphate (NiS0$_4$••6H$_2$O) 280 g/L Nickel Chloride (NiCl$_2$•6H$_2$O) 40 g/L Boric Acid (H$_3$BO$_3$) 30 g/L |
| Counter Electrode: | Double Platinum Foil Purity 99.95% $20 \times 50 \times (0.004")$ | Double Platinum Foil Purity 99.95% $20 \times 50 \times (0.004")$ | Nickel Spheres (6 to 16 mm p.a.) in contact with a Nickel Foil Electrode 99.9+% Purity (0.125 mm thick) |
| Temperature: | 70° C. | 70° C. | 45° C. |
| Time: | See Applied Current | See Applied Current | 8 h approximately |
| Loading: | 5 mg/cm of Fiber | 5 mg/cm of Fiber | Fixed Parameter, Between 6-8 mg/length of fiber |
| Applied Current: | 100 mA (30 min) + 120 mA (30-60 min), depending on loading | 40 mA (10 min) 4-60 (10 min) H-80 mA (10 min) 4-100 mA (1-2 h), depending on loading | Stairs from 100 mA, to 120 mA and then to 140 mA | shown if FIG. 7. The plating procedure can include two steps: 1. First layer plating and 2. Second layer plating.

First layer plating includes plating the carbon support with materials that show a strong affinity for OH. Examples include, but are not limited to Rh, Ru, Ni, and Pd. In one preferred embodiment, Rh is used. The first layer coverage should completely plate the carbon support. In some embodiments, the first layer coverage is at least 2 mg/cm of carbon fiber to guarantee a complete plating of the carbon support. In other embodiments, the first layer coverage can be 2.5 mg/cm, 3.0 mg/cm, 3.5 mg/cm, or more.

Second layer plating includes plating the electrode with materials that have a strong affinity for the oxidation of ammonia and/or ethanol. Examples include: Pt and Ir. Monometallic deposition and/or bimetallic deposition of these materials can be performed. Ratios of Pt:Ir can range from 100% Pt-0% Ir to 50% Pt-50% Ir.

Table I summarizes the plating conditions for the anode and the cathode of the electrochemical cell. After plating the Rhodium, the electrode is weighted. The weight corresponds to the Rhodium loading. Then, the Platinum is deposited on top of the Rhodium. After the procedure is completed, the electrode is measured again. The measurement will correspond to the total loading. The Platinum loading is obtained by subtracting the total loading from the previous Rhodium measurement. The relation of Platinum to Rhodium is then calculated as the percentage of fixed loading. Because the loading depends on the length of the fiber, another measurement should be calculated. It is known that 10 cm of fiber weights 39.1 mg, and because the weight of the fiber is

TABLE 2

General Conditions of the Plating Bath

| Pretreatment | Degreasing using acetone |
|---|---|
| Bath Type | Chloride salts in HCl |
| Solution Composition | Metal/metal ratios varied for optimum deposit composition |
| Applied Current | Galvanostatic (1 to 200 mA) |
| Deposition Time | Varied from 30 minutes to several hours |

TABLE 3

Examples of some Electrode Compositions and Loadings

| ID | Composition | Ratio Pt:Rh | Total Loading, mg | Length, cm | Mg/cm |
|---|---|---|---|---|---|
| 2x2-1 | 21%Rh—79%Pt | 3.81 | 252.5 | 30.0 | 8.4 |
| 2x2-2 | 30%Rh—70%Pt | 2.31 | 146.0 | 33.4 | 4.4 |
| 2x2-3 | 23%Rh—73%Pt | 3.44 | 151.5 | 30.5 | 5.0 |
| 2x2-4 | 30%Rh—70%Pt | 2.32 | 308.8 | 31.3 | 9.9 |
| 2x2-5 | Rh—Ir—Pt | 1.36 | 196.4 | 38.0 | 5.2 |
| 2x2-6 | 80%Rh—20%Pt | 0.25 | 169.9 | 33.3 | 5.1 |
| 2x2-7 | 100%Rh | — | 157.0 | 31.6 | 5.0 |
| 2x2-8 | 30%Rh—70%Pt | 2.30 | 160.6 | 30.9 | 5.2 |
| 2x2-9 | 100%Pt | — | 161.9 | 32.3 | 5.0 |

For example, in a solution stirred at 60 rpm, at a temperature of 78 degrees centigrade, the platinum and iridium salts dihydrogen hexachloroplatinate (IV) (H$_2$PtCl$_6$.6H$_2$O—38% Pt—Alfa Aesar® Item No. 11051), and iridium chloride (IrCl$_3$—55% Ir Alfa Aesar Item No. 11030) from Alfa Aesar, were added to a bath of 1M hydrochloric acid. The purity of both salts were 99.9% (metal basis). Salt concentrations can be varied depending on the desired net loading of the platinum and iridium. For platinum salt, 90 mg net/38% Pt in salt=236 mg of Pt salt needed for bath. The same calculation applies Ir, but the purity of iridium in the salt is 55%. The anode used in this example was 4 cm×4 cm Pt foil (0.102 mm thick 99.95% from ESPI Metals).

The cathode was weighed before plating to allow determining the mass of metal deposited. The potential was maintained at −0.1 volts versus an Ag/AgCl electrode. The cathode was removed and rinsed with ultrapure water, then weighed to determine the amount of Pt—Ir deposited. It is contemplated that approximately 340 mg of Pt—Ir can be plated in about 1.6 hours.

To plate the layered electrocatalyst with only platinum, the same conditions can be used, however only dihydrogen hexachloroplatinate (IV) ($H_2PtCl_6 \cdot 6H_2O$—38% Pt) is used. The plating potential in this example is −0.12 V vs Ag/AgCl.

To plate Rh, identical conditions can be used, except that the catalytic salt would be Rhodium (III) chloride hydrate (Alfa Aesar Item No. 11032-42% Rh). The electrodeposition potential would be −0.11 V vs. Ag/AgCl.

To plate Ru identical conditions can be used, except that the catalytic salt would be Ruthenium (III) chloride (Alfa Aesar Item No. 11043-50% Ru). The electrodeposition potential would be −0.12 V vs. Ag/AgCl.

To plate the layered electrocatalyst with Ru—Pt, the same conditions can be used, except that the catalytic salts would be Ruthenium (III) chloride (Alfa Aesar Item No. 11043—50% Ru) and Dihydrogen hexachloroplatinate (IV) ($H_2PtCl_6 \cdot 6H_2O$—38% Pt). The electrodeposition potential would be −0.10 V vs. Ag/AgCl.

To plate Ru—Pt—Ir, the same conditions can be used, except that the catalytic salts would be Rhodium (III) chloride hydrate (Alfa Aesar Item No. 11032-42% Rh), Dihydrogen hexachloroplatinate (IV) (Alfa Aesar Item No. 11051-38% Pt)—38% Pt), and Iridium chloride (Alfa Aesar Item No. 11030-55% Ir). The electrodeposition potential would be −0.11 V vs. Ag/AgCl.

To plate the layered electrocatalyst with nickel, a solution containing 280 g/L Nickel (II) sulfate, 40 g/L Nickel (II) chloride hexahydrate, and 30 g/L Boric acid (all from Fisher Scientific™) can be solvated with HPLC ultrapure water, then heated to 45 degrees Centigrade and mixed. An anode prepared from 0.127 mm thick Nickel foil (99+% from Alfa Aesar), that is twice the size of the cathode can be used. Using an Ag/AgCl reference electrode, Ni can be plated with high efficiencies at a potential of −0.8 V.

Referring now to FIG. 1, FIG. 1 depicts an embodiment of the present layered catalyst.

A carbon support (26) is shown integrated with a conductive metal (90). While FIG. 1 depicts the carbon support (26) adhered to a conductive metal plate, the carbon support (26) could also be integrated with conductive metals via winding, such as by winding carbon fibers around titanium gauze, or through other means.

A first metal plating layer (28) is disposed on the carbon support (26). A second metal plating layer (30) is shown partially disposed on the first metal plating layer (28).

While FIG. 1 depicts the second metal plating layer (30) partially disposed on the first metal plating layer (28), the second metal layer (30) can partially or wholly cover the first metal plating layer (28).

Both metal plating layers (28, 30) can have uniform or varying thickness, including one or more perforations or portions that do not cover the carbon support (26).

Figure 2:
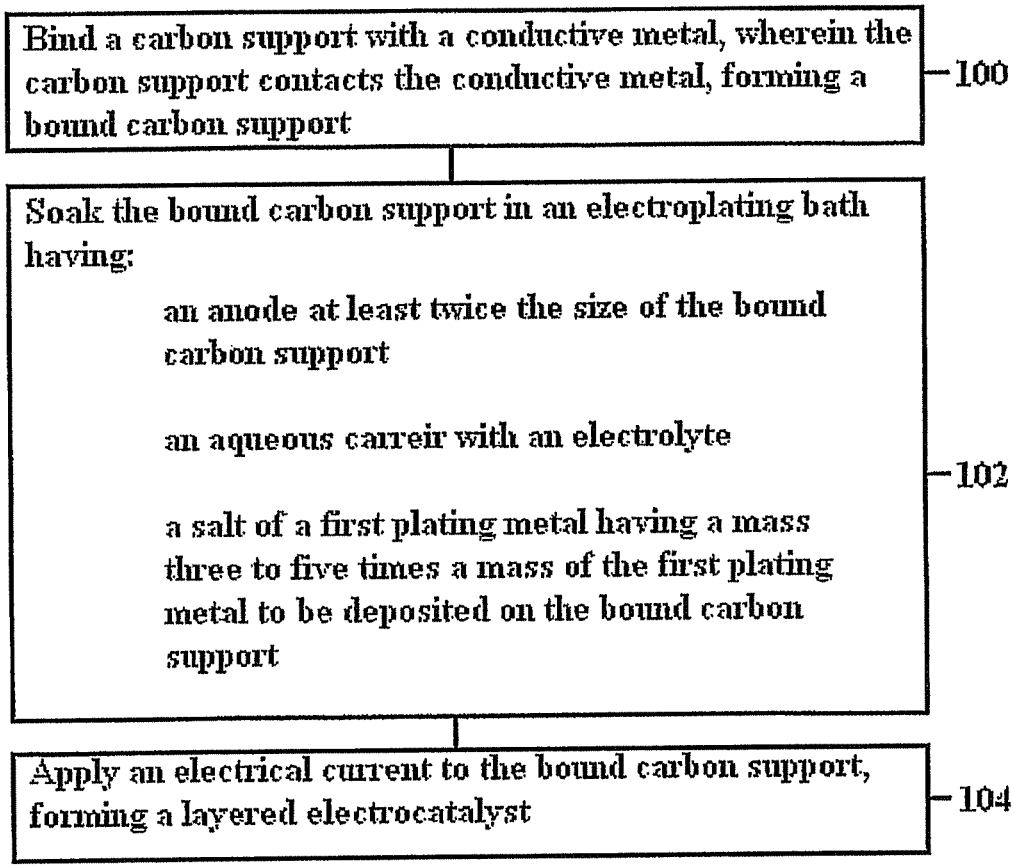
FIG. 2 depicts a diagram of an embodiment of a method for making the present layered electrocatalyst.

Referring now to FIG. 2, a diagram of an embodiment of a method for making the present layered catalyst is shown.

FIG. 2 depicts that the method includes binding a carbon support with a conductive metal, such that the carbon support contacts the conductive metal, to form a bound carbon support (100).

The bound carbon support is then soaked in an electroplating bath (102). The electroplating bath includes: an anode at least twice the size of the bound carbon support, an aqueous carrier with an electrolyte, and a salt of a first plating metal having a mass three to five times the mass of the first plating metal to be deposited to the bound carbon support.

An electrical current is applied to the bound carbon support (104), thereby causing the first plating metal to be plated from the salt to the bound carbon support, forming the layered electrocatalyst.

It should be understood that the method can be repeated by placing the layered catalyst in a second electroplating bath having a salt of a second plating metal, to provide a second layer of a second metal to the layered electrocatalyst. Any number of layers of any combination of metals can be deposited on the layered electrocatalyst, as needed, enabling the present layered electrocatalyst to be customized to meet the needs of a user.

While these embodiments have been described with emphasis on the embodiments, it should be understood that within the scope of the appended claims, the embodiments might be practiced other than as specifically described herein.

What is claimed is:

1. A sensor for detecting ammonia, ethanol, or combinations thereof, the sensor comprising:
   a layered electrocatalyst comprising:
      a carbon support integrated with a conductive metal;
      at least one first metal plating layer at least partially deposited on the carbon support, wherein the at least one first metal plating layer has a thickness ranging from 10 nanometers to 10 microns, and wherein the at least one first metal plating layer is active to OH adsorption and inactive to the ammonia, ethanol, or combinations thereof; and
      at least one second metal plating layer at least partially deposited on the carbon support, wherein the at least one second metal plating layer does not completely cover the at least one first metal plating layer and has regions of varying thickness with at least one region having a thickness ranging from 10 nanometers to 10 microns, and wherein the at least one second metal plating layer is active to ammonia, ethanol, or combinations thereof, and detects the ammonia, ethanol, or combinations thereof; and
   a counter electrode.

2. The sensor of claim 1, wherein the at least one first metal plating layer comprises rhodium, rubidium, iridium, rhenium, platinum, palladium, copper, silver, gold, nickel, iron, or combinations thereof.

3. The sensor of claim 1, wherein the at least one second metal plating layer comprises platinum, iridium, or combinations thereof.

4. The sensor of claim 1, wherein the carbon support comprises carbon fibers, carbon tubes, carbon microtubes, carbon microspheres, nano-sized carbon fibers, nano-sized carbon tubes, carbon sheets, or combinations thereof.

5. The sensor of claim 1, further comprising a reference electrode.

6. The sensor of claim 1, wherein the at least one first metal plating layer comprises at least one of palladium, rhodium or ruthenium.

7. The sensor of claim 1, wherein the at least one second metal plating layer has a first thickness ranging from 0 to 500 nanometers on a first portion of the carbon support and a second thickness ranging from 0 to 500 nanometers on a second portion of the carbon support.

8. The sensor of claim 1, wherein the at least one second plating layer comprises platinum and iridium combinations.

9. The sensor of claim 8, wherein the platinum to iridium is used in a ratio that ranges from 99.99:0.01 to 50:50 platinum: iridium, respectively.

10. The sensor of claim 1, wherein the at least one first metal plating layer is a continuous layer.

11. A method of measuring a concentration of ammonia, ethanol, or combinations thereof, the method comprising:
 operating the sensor of claim 1 in the presence of ammonia, ethanol, or combinations thereof, wherein the operating the sensor comprises applying an operating electrical current or an operating voltage; and
 measuring an electrical current or a voltage, wherein the electrical current or voltage is proportional to the concentration of ammonia, ethanol, or combinations thereof.

12. The method of claim 11, wherein the sensor further comprises a reference electrode.

\* \* \* \* \*